United States Patent
Lager et al.

(10) Patent No.: US 11,713,660 B2
(45) Date of Patent: Aug. 1, 2023

(54) METHOD FOR RECOVERING HYDROCARBONS

(71) Applicant: TotalEnergies SE, Courbevoie (FR)

(72) Inventors: Arnaud Lager, Pau (FR);
Pierre-Edouard Schreiber, Pau (FR)

(73) Assignee: TOTALENERGIES SE, Courbevoie (FR)

( * ) Notice: Subject to any disclaimer, the term of this patent is extended or adjusted under 35 U.S.C. 154(b) by 58 days.

(21) Appl. No.: 17/430,927

(22) PCT Filed: Feb. 14, 2019

(86) PCT No.: PCT/IB2019/000169
§ 371 (c)(1),
(2) Date: Aug. 13, 2021

(87) PCT Pub. No.: WO2020/165618
PCT Pub. Date: Aug. 20, 2020

(65) Prior Publication Data
US 2022/0127938 A1    Apr. 28, 2022

(51) Int. Cl.
*E21B 43/16*    (2006.01)
*E21B 43/20*    (2006.01)

(52) U.S. Cl.
CPC .......... *E21B 43/16* (2013.01); *E21B 43/162* (2013.01); *E21B 43/20* (2013.01)

(58) Field of Classification Search
CPC ......... E21B 43/16; E21B 43/20; E21B 43/162
See application file for complete search history.

(56) References Cited

U.S. PATENT DOCUMENTS

| | | | |
|---|---|---|---|
| 4,814,096 A | 3/1989 | Evani | |
| 4,899,818 A | 2/1990 | Jennings, Jr. | |
| 5,076,362 A | 12/1991 | Beardmore | |
| 2011/0265994 A1* | 11/2011 | Entchev | C09K 8/508 166/270 |
| 2012/0085555 A1* | 4/2012 | Collins | C09K 8/58 166/275 |
| 2012/0205099 A1* | 8/2012 | Briechle | C09K 8/588 166/270.1 |
| 2013/0213892 A1* | 8/2013 | Henthorne | B01D 61/027 210/96.2 |
| 2014/0326457 A1* | 11/2014 | Favero | C09K 8/588 166/305.1 |
| 2015/0247392 A1* | 9/2015 | Portwood | C09K 8/518 166/305.1 |
| 2017/0044884 A1* | 2/2017 | Mahmoud | C09K 8/594 |

FOREIGN PATENT DOCUMENTS

| | | |
|---|---|---|
| EP | 2228514 A1 | 9/2010 |
| WO | 201456946 A2 | 4/2014 |
| WO | 2018197479 A1 | 11/2018 |

OTHER PUBLICATIONS

Abdel-Azim A., et al., "Determination of intrinsic viscosity of polymeric compounds through a single specific viscosity measurement," Polymer, 39(26) pp. 6827-6833 (1998).
Bouldin M. et al. (Prediction of the non-Newtonian viscosity and shear stability of polymer solutions), 1988 (doi.org/10.1007/BF01417863).
Grigorescu G. et. al. (Prediction of viscoelastic properties and shear stability of polymers in solution), 2000 (doi.org/10.1007/3-540-46778-5_1).
Kulicke W.-M. et al. (Description and forecast of rheological characteristics of semi-dilute polymer solutions as a function of the molecular weight, concentration and sa/vent quality), 1991 (Polymer News, vol. 16, pp. 39-48).
Kulicke W.-M. et al. (The shear viscosity dependence on the 5 concentration, molecular weight, and shear rate of polystyrene solutions), 1984 (doi.org/10.1007/BF01333878).
Masalmeh, Shehadeh K., et al., "Developing High Resolution Static and Dynamic Models for Waterflood History Matching and EOR Evaluation of a Middle Eastern Carbonate," Society of Petroleum Engineers, 10:2118/161485 (2012).
Masalmeh, S. K., et al., "EOR Options for Heterogeneous Carbonate Reservoirs Currently Under Waterflooding," Society of Petroleum Engineers, 10:2118/171900-MS (2014).
Masalmeh, S. K., et al., "Simultaneous Injection of Water and Polymer (SIWAP) to Improve Oil Recovery and Sweep Efficiency from Layered Carbonate Reservoirs," Society of Petroleum Engineers, 10:2118/144865-MS (2011).
Szopinski D. et al., "Structure-property relationships of 25 carboxymethyl hydroxypropyl guar gum in water and a hyperentanglement parameter," doi.org/10.1016/j.carbpol.2014.11.050 (2015).
International Search Report and Written Opinion for International Application No. PCT/IB2019/000194, filed Feb. 14, 2019, entitled "Method for Enhanced Oil Recovery," dated Oct. 29, 2019.
International Search Report and Written Opinion for International Application No. PCT/IB2019/000169, filed Feb. 14, 2019, entitled "Method for Enhanced Oil Recovery," dated Nov. 8, 2019.

* cited by examiner

*Primary Examiner* — Silvana C Runyan
(74) *Attorney, Agent, or Firm* — Hamilton, Brook, Smith & Reynolds, P.C.

(57) ABSTRACT

The present invention relates to methods for recovering hydrocarbons from subterranean formations. One such example embodiment injects a polymer solution into an upper layer of a subterranean formation and, likewise, injects an aqueous solution into a lower layer of the subterranean formation. Hydrocarbons displaced by at least one of the injected polymer and the injected aqueous solution are collected.

17 Claims, 1 Drawing Sheet

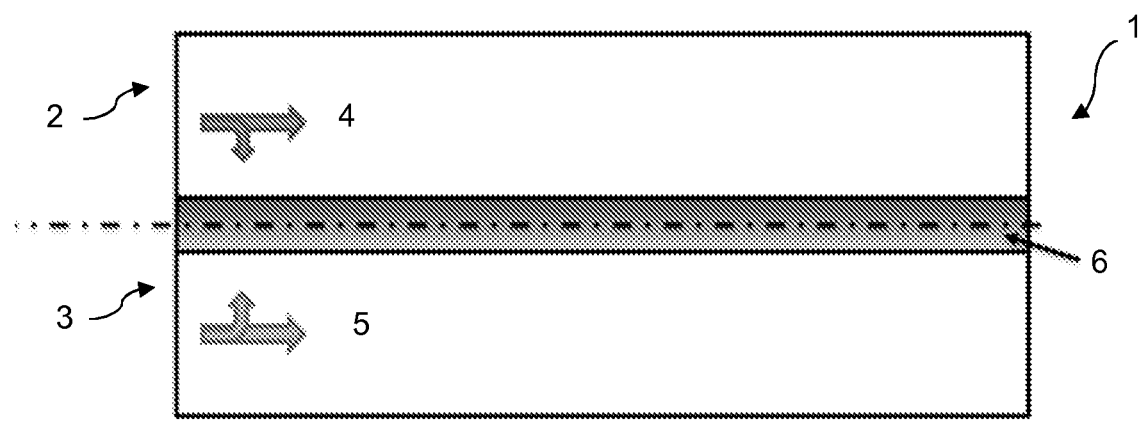

METHOD FOR RECOVERING HYDROCARBONS

This application is the U.S. National Stage of International Application No. PCT/IB2019/000169, filed Feb. 14, 2019, which designates the U.S., published in English. The entire teachings of the above application are incorporated herein by reference.

TECHNICAL FIELD

The present invention relates to an improved method for the recovery of hydrocarbons from a subterranean formation comprising at least one high permeability upper layer and at least one low permeability lower layer.

TECHNICAL BACKGROUND

Hydrocarbons (such as crude oil) are extracted from a subterranean formation (or reservoir) by means of one or more production wells drilled in the reservoir. Before production begins, the formation, which is a porous medium, is saturated with hydrocarbons.

The initial recovery of hydrocarbons is generally carried out by techniques of "primary recovery", in which only the natural forces present in the reservoir are relied upon. In this primary recovery, only part of the hydrocarbons is ejected from the pores by the pressure of the formation. Typically, once the natural forces are exhausted and primary recovery is completed, there is still a large volume of hydrocarbons left in the reservoir.

This phenomenon has led to the development of enhanced oil recovery (EOR) techniques. Many of such EOR techniques rely on the injection of a fluid into the reservoir in order to produce an additional quantity of hydrocarbons.

The fluid used can in particular be an aqueous solution ("waterflooding process"), such as brine, which is injected via one or more injection wells.

Large amounts of water can also be recovered from the production wells. This is called "produced water". The produced water can be e.g. discharged to the environment (after treatment) or reinjected into the subterranean formation via the injection wells.

A polymer can also be added to the water to increase its viscosity and increase its sweep efficiency in recovering hydrocarbons ("polymer flooding process"). In this case, the produced water contains part of the polymer, which can thus be recovered.

In subterranean formations having layered systems comprising low permeability and high permeability layers, the existing methods have shown hydrocarbon recovery levels that need improvement. More specifically, in a layered subterranean formation where a high permeability layer is located above a low permeability layer, gravity leads to cross-flow of injected water from the top to the bottom zone of the subterranean formation. However, in the case of oil-wet subterranean formations, capillary forces act opposite to gravity and result in a barrier which prevents water from moving downwards, limits the cross-flow between the different layers and leads to poor sweep efficiency of the low permeability layer.

The article of Mesalmeh S. K. et al. (*EOR options for heterogenous carbonate reservoirs currently under waterflooding*), 2014 (doi:10.2118/171900-ms) describes different techniques used for the improvement of hydrocarbon recovery from the lower zone of a subterranean formation. Such techniques are: optimized waterflooding with infill wells, polymer-assisted techniques consisting of injecting polymer in the upper zone and water or miscible gas in the lower zone, as well as surfactant-assisted techniques.

The article of Mesalmeh S. K. et al. (*Simultaneous injection of water and polymer (SIWAP) to improve oil recovery and sweep efficiency from layered carbonate reservoirs*), 2011 (doi:10.2118/144865-ms) describes a method according to which water and polymer are injected simultaneously into the lower and upper zone of a subterranean formation respectively, in order to minimize cross-flow of injected water from the lower zone and improve sweep efficiency of both the upper and the lower zone.

Document WO 2014/056946 describes a method for producing hydrocarbons from a multilayer system which comprises at least one high permeability layer and at least one low permeability layer, the high permeability layer being adjacent to the low permeability layer. The method comprises the injection of a first injectant, which can be for example a liquid such as water, into the high permeability layer, the simultaneous injection of a second injectant, which can be for example a gas such as carbon dioxide, nitrogen gas, hydrocarbon gas or a mixture thereof, into the low permeability layer, as well as the collection of oil replaced by the first and second injectant in the high and low permeability layers.

Document EP 2 228 514 concerns a method for improving the oil productivity and recovery of a layered oil reservoir having an upper layer that is more permeable than a lower layer of the oil reservoir. The method comprises the injection of a viscosified aqueous liquid into the upper layer, the injection of a non-aqueous fluid that is miscible with the oil into the lower layer, and the recovery of oil from the layered formation.

There is still a need for a method for improving productivity and hydrocarbon recovery from a layered subterranean formation in an efficient and cost-effective manner.

SUMMARY OF THE INVENTION

It is the object of the invention to provide method for recovering hydrocarbons from a subterranean formation comprising at least one upper layer and at least one lower layer, the permeability of the upper layer being higher than the permeability of the lower layer; the method comprising the steps of:
injecting a polymer solution, containing a polymer, into the upper layer;
injecting an aqueous solution into the lower layer, the aqueous solution having a lower salinity than the polymer solution; and
collecting hydrocarbons displaced by the injected polymer solution and/or the injected aqueous solution.

According to some embodiments, the permeability of the upper layer is higher than the permeability of the lower layer by a factor of at least 2, preferably at least 5, more preferably at least 10.

According to some embodiments, the permeability of the upper layer is from 100 to 10 000 mD.

According to some embodiments, the permeability of the lower layer is from 1 to 50 mD.

According to some embodiments, the salinity of the polymer solution is from 40 to 400 g/L.

According to some embodiments, the salinity of the aqueous solution is less than 10 g/L, and preferably less than 5 g/L.

According to some embodiments, the polymer solution has a viscosity from 1 to 200 cP.

According to some embodiments, the aqueous solution has a viscosity from 0.2 to 1 cP.

According to some embodiments, the concentration of polymer in the polymer solution is from 3 000 to 7 000 ppm, and preferably from 4 000 to 6 000 ppm (w/v).

According to some embodiments, the polymer is chosen from hydrolyzed polyacrylamide, partially hydrolyzed polyacrylamide, poly-N,N-dimethylacrylamide, polyvinyl pyrrolidone, poly(vinylamines), poly(2-acrylamido-2-methyl-1-propanesulfonic acid), biopolymers such as scleroglucans and xanthan gum, hydrophobically-modified associative polymers, co-polymers of polyacrylamide, 2-acrylamido 2-methylpropane sulfonic acid, and N-vinyl pyrrolidone.

According to some embodiments, the injecting steps are carried out via at least one injection well, and the steps of collecting hydrocarbons are carried out via at least one production well.

According to some embodiments, the polymer solution and the aqueous solution derive from an initial source chosen from sea water, brackish brine, and produced water.

According to some embodiments, the initial source is subjected to a desalination process, at the end of which a first solution is obtained on the one hand, the first solution being the aqueous solution and having a lower salinity than the initial source; and a second solution is obtained on the other hand, the second solution being used to form the polymer solution and the second solution having a higher salinity than the initial source.

According to some embodiments, the desalination process is chosen from reverse osmosis, forward osmosis, nanofiltration, ultrafiltration, electrodialysis, distillation, membrane filtration processes and combinations thereof.

The present invention makes it possible to address the need mentioned above. In particular, the invention provides a method for improving productivity and hydrocarbon recovery from a layered subterranean formation in an efficient and cost-effective manner.

This is achieved by injecting a polymer solution into the upper layer of the subterranean formation and by injecting an aqueous solution into the lower layer of the subterranean formation, the aqueous solution having a lower salinity than the polymer solution. When the aqueous solution comes in contact with the polymer solution, a mixture of both solutions is formed in an intermediate area between the upper and lower layers. Given that the viscosity of a polymer depends on the salinity of the solution (the lower the salinity of the solution, the higher the viscosity of the polymer), the mixture comprised in the intermediate area has an increased viscosity compared to the aqueous solution and to the polymer solution. This highly viscous mixture creates a barrier in the intermediate area between the upper layer and the lower layer and prevents the low salinity aqueous solution from rising further into the upper layer, therefore increasing the sweep efficiency in the lower and upper layers.

Advantageously, and according to some embodiments, the present invention makes use of a desalination process for the production of the aqueous solution of low salinity as well as the solution used for the formation of the high salinity polymer solution. Generally, in a desalination process, part of the initial solution treated, becomes a solution of lower salinity while the other part becomes a solution of higher salinity compared to the salinity of the initial solution. As the higher salinity solution formed in the end of the process is usually discharged and not used, the desalination process is not always considered to be an efficient process. On the contrary, in the present invention, both solutions provided by the desalination process may be used for the implementation of the invention.

BRIEF DESCRIPTION OF THE DRAWINGS

In FIG. 1, a subterranean formation according to the invention is illustrated in a schematic manner.

DESCRIPTION OF EMBODIMENTS

The invention will now be described in more detail without limitation in the following description.
EOR Process Referring to FIG. 1, the method of the present invention is implemented in a multilayer subterranean formation 1, which comprises at least one upper layer 2 and at least one lower layer 3. The multilayer subterranean formation 1 may be an oil-wet carbonate reservoir. By "oil-wet" is meant a formation which preferentially imbibes oil.

The upper layer 2 is preferably adjacent to the lower layer 3.

The upper layer 2 has a higher permeability than the lower layer 3. The permeability of the upper layer 2 may be higher than the permeability of the lower layer 3 by a factor of at least 2, preferably at least 10, more preferably at least 50, and even more preferably at least 100, as measured in mili Darcy (mD) and as estimated by well log. For example, the permeability of the upper layer 2 may be higher than the permeability of the lower layer 3 by a factor of 10 to 20, or of 20 to 30, or of 30 to 40, or of 40 to 50, or of 50 to 60, or of 60 to 70, or of 70 to 80, or of 80 to 90, or of 90 to 100, or by a factor higher than 100.

The multilayer subterranean formation 1 of the present invention may consist of only one high permeability layer and only one low permeability layer.

Alternatively, there may be yet further layers in the formation 1, in particular further layers located above the upper layer 2 and/or below the lower layer 3 and having different permeabilities.

The multilayer subterranean formation 1 of the present invention may in particular comprise multiple stacked layers of different permeabilities. The multilayer subterranean formation 1 of the present invention may notably comprise three or four or five or ten layers having different permeabilities. The permeability of the layers may decrease from the top to the bottom of the formation. Alternatively, higher permeability layers may alternate with lower permeability layers.

According to some embodiments, the permeability of the upper layer 2 may be from 100 to 10 000 mD. Therefore, the permeability of the upper layer 2 may be from 100 to 250 mD; or from 250 to 500 mD; or from 500 to 1 000 mD; or from 1 000 to 2 000 mD; or from 2 000 to 3 000 mD; or from 3 000 to 4 000 mD; or from 4 000 to 5 000 mD; or from 5 000 to 6 000 mD; or from 6 000 to 7 000 mD; or from 7 000 to 8 000 mD; or from 8 000 to 9 000 mD; or from 9 000 to 10 000 mD.

According to some embodiments, the permeability of the lower layer 3 may be from 1 to 50 mD. Therefore, the permeability of the lower layer 3 may be from 1 to 2 mD; or from 2 to 3 mD; or from 3 to 4 mD; or from 4 to 5 mD; or from 5 to 6 mD; or from 6 to 7 mD; or from 7 to 8 mD; or from 8 to 9 mD; or from 9 to 10 mD; or from 10 to 15 mD; or from 15 to 20 mD; or from 20 to 25 mD; or from 25 to 30 mD; or from 30 to 35 mD; or from 35 to 40 mD; or from 40 to 45 mD; or from 45 to 50 mD.

The upper layer 2 and the lower layer 3 of the subterranean formation 1 according to the invention may be substantially horizontal (parallel to the plane of the horizon) or may have an inclination e.g. equal to or less than 5° relative to the plane of the horizon.

The temperature within the subterranean formation 1 may range from 25 to 180° C., preferably from 80 to 140° C. and more preferably from 100 to 120° C. The temperature may vary slightly between the upper and lower layers therefore depending on the depth of the formation. For example, the temperature may vary from 1 to 5° C., preferably 3° C. every 100 meters.

According to the invention, a polymer solution 4 is injected into upper layer 2 and an aqueous solution 5 is injected into the lower layer 3. The polymer solution 4 has a higher salinity than the salinity of the aqueous solution 5.

The salinity is defined herein as the total concentration of dissolved inorganic salts in water, including e.g. NaCl, $CaCl_2$, $MgCl_2$ and any other inorganic salts. The salinity is measured using a conductivity probe and is expressed as $g \cdot L^{-1}$ of Total Dissolved Solids.

According to some embodiments, the salinity of the polymer solution 4 (at the time of the injection) can be from 40 to 400 g/L, preferably from 100 to 350 g/L and more preferably from 250 to 300 g/L. For example, the salinity of the polymer solution 4 (at the time of the injection) can be from 40 to 100 g/L; or from 100 to 150 g/L; or from 150 to 200 g/L; or from 200 to 250 g/L; or from 250 to 300 g/L; or from 300 to 350 g/L; or from 350 to 400 g/L.

According to some embodiments, the salinity of the aqueous solution 5 (at the time of the injection) can be less than 10 g/L, and preferably less than 5 g/L. Thus, the salinity of the aqueous solution 5 (at the time of the injection) can be from 0.1 to 1 g/L; or from 1 to 2 g/L; or from 2 to 3 g/L; or from 3 to 4 g/L; or from 4 to 5 g/L; or from 5 to 6 g/L; or from 6 to 7 g/L; or from 7 to 8 g/L; or from 8 to 9 g/L; or from 9 to 10 g/L.

The polymer solution 4 (at the time of the injection) may have a viscosity from 1 to 200 cP. For example, the polymer solution 4 may have a viscosity from 1 to 10 cP; or from 10 to 20 cP; or from 20 to 30 cP; or from 30 to 40 cP; or from 40 to 50 cP; or from 50 to 60 cP; or from 60 to 70 cP; or from 70 to 80 cP; or from 8 to 90 cP; or from 90 to 100 cP; or from 100 to 110 cP; or from 110 to 120 cP; or from 120 to 130 cP; or from 130 to 140 cP; or from 140 to 150 cP; or from 150 to 160 cP; or from 160 to 170 cP; or from 170 to 180 cP; or from 180 to 190 cP; or from 190 to 200 cP (at the time of the injection).

The aqueous solution 5 (at the time of the injection) may have a viscosity from 0.2 to 1 cP. For example, the aqueous solution 5 may have a viscosity from 0.2 to 0.3 cP; or from 0.3 to 0.4 cP; or from 0.4 to 0.5 cP; or from 0.5 to 0.6 cP; or from 0.6 to 0.7 cP; or from 0.7 to 0.8 cP; or from 0.8 to 0.9 cP; or from 0.9 to 1 cP (at the time of the injection).

The above viscosities are measured at the temperature of the subterranean formation using a rheometer, for example an Anton-Paars rheometer.

According to some embodiments, the concentration of the polymer in the polymer solution 4 (at the time of the injection) can be from 3 000 to 7 000 ppm, and preferably from 4 000 to 6 000 ppm. For example, the concentration of the polymer in the polymer solution 4 (at the time of the injection) can be from 3 000 to 3 500 ppm; or from 3 500 to 4 000 ppm; or from 4 000 to 4 500 ppm; or from 4 500 to 5 000 ppm; or from 5 000 to 5 500 ppm; or from 5 500 to 6 000 ppm; or from 6 000 ppm; or from 6 000 to 6 500 ppm; or from 6 500 to 7 000 ppm. The above values are weight by volume values.

The present invention offers the advantage of using lower amounts of polymer than prior art methods. In fact, as the viscosity of the polymer increases due to its contact with the low salinity aqueous solution 5 to form a highly viscous mixture located in the intermediate area 6 between the upper and lower layers, it is not necessary for the polymer solution 4 to have a high viscosity, and therefore lower amounts of polymer can be used.

The polymer solution 4 may comprise one or more polymers chosen from hydrolyzed polyacrylamide (HPAM), partially hydrolyzed polyacrylamide, poly-N,N-dimethylacrylamide, polyvinyl pyrrolidone (PVP), poly(vinylamines), poly(2-acrylamido-2-methyl-1-propanesulfonic acid), biopolymers such as scleroglucans, guar and cellulose derivative and xanthan gum, hydrophobically-modified associative polymers, co-polymers of polyacrylamide (PAM), 2-acrylamido 2-methylpropane sulfonic acid, and N-vinyl pyrrolidone (NVP) or any other type of polymer used in the chemical EOR context. Preferably, the polymer solution 4 comprises one polymer and more preferably the one polymer is hydrolyzed polyacrylamide.

Apart from the one or more polymers, the polymer solution 4 can notably comprise various additives, such as surfactants, salts, sacrificial agents, pH adjustment agents, solvents, marking agents . . . .

The aqueous solution 5 can be water or brine, optionally containing various additives, such as surfactants, salts, sacrificial agents, pH adjustment agents, solvents, marking agents . . . .

The aqueous solution 5 may comprise polymers, such as those described above in relation with the polymer solution 4. However, in preferred embodiments, the aqueous solution 5 is substantially free of polymers.

Both the aqueous solution 5 and the polymer solution 4 may derive from a same initial source, which can be chosen from any kind of surface water (including sea water), brackish brine and produced water.

According to some embodiments, the injection of the polymer solution 4 is carried out prior to the injection of the aqueous solution 5. Alternatively, the polymer solution 4 and the aqueous solution 5 may be injected simultaneously. Said injections may be performed via one or several injection wells. More particularly, the polymer solution 4 and the aqueous solution 5 can be injected via different injection wells or via the same injection well(s). In the latter case, they can be injected via distinct tubing within a same injection well. The injection wells can be horizontal or vertical. If more than one injection well is used, the injection wells are preferably closely grouped together. For example, two injection wells can by separated by a distance of 50 to 200 m from one another, and preferably a distance of 100 to 150 m from one another.

The injection of the polymer solution 4 and the aqueous solution 5 may be performed e.g. at a pressure from 70 to 300 bar, preferably from 100 to 250 bar.

The flow rate of injection of the polymer solution 4 may be from 500 to 10000 Bbls and preferably from 1000 to 5000 Bbls.

The flow rate of injection of the aqueous solution 5 may be from 500 to 10000, and preferably from 1000 to 5000 bbls Preferably, the rates of injection of the polymer solution 4 and the aqueous solution 5 are such that the front of the polymer solution 4 in the subterranean formation 1 is ahead of the front of the aqueous solution 5.

By injecting the polymer solution 4 into the upper layer 2 and the aqueous solution 5 into the lower layer 3, each solution moves into the respective layer while displacing hydrocarbons in the direction of the arrows illustrated in FIG. 1. At the same time, due to the tendency of the aqueous solution 5 to cross-flow from the lower layer 3 to the upper layer 2, the low salinity aqueous solution 5 comes into contact with the high salinity polymer solution 4 in an intermediate area 6 between the upper layer 2 and the lower layer 3. In the intermediate area 6 flows a mixture of the polymer solution 4 and the aqueous solution 5. This mixture has a viscosity which is higher than the viscosity of the polymer solution 4 and higher than the viscosity of the aqueous solution 5. Due to this high viscosity, the intermediate area 6 becomes substantially impermeable and acts as a barrier so that the low salinity aqueous solution 5 does not rise into the upper layer 2. As a result, each solution stays in its respective layer allowing a higher sweep efficiency of both layers.

According to some embodiments, the mixture of polymer solution 4 and aqueous solution 5 in the intermediate area 6 has a viscosity (in situ) from 2 to 400 cP. For example, the intermediate area 6 can have a viscosity from 2 to 10 cP; or from 10 to 50 cP; or from 50 to 100 cP; or from 100 to 150 cP; or from 150 to 200 cP; or from 200 to 250 cP; or from 250 to 300 cP; or from 300 to 350 cP; or from 350 to 400 cP. Preferably, the viscosity of the mixture in the intermediate area 6 is higher than the viscosity of the aqueous solution 5 by a factor of at least 10.

According to the present invention, the hydrocarbons displaced by the injected polymer solution 4 as well as the hydrocarbons displaced by the aqueous solution 5 can be collected as a stream via one or more production wells. The stream of collected hydrocarbons may notably contain produced water, part of the polymer deriving from the polymer solution 4, as well as other compounds such as solids or other chemicals.

The molecular weight of the polymer in the stream of collected hydrocarbons can be lower than the molecular weight of the polymer in the polymer solution 4, as the polymer may be damaged notably to the high shear to which it is subjected during its injection into the reservoir, its travel through the reservoir, and its extraction from the reservoir.

According to some embodiments, the part of polymer recovered in the stream of collected hydrocarbons can advantageously be separated from the hydrocarbons so as to be recycled and reused.

The stream of hydrocarbons can be collected via different production wells or via the same production well(s), for example via distinct pipelines within a same production well. The production wells can be horizontal or vertical.

According to some embodiments, the method of the invention is a continuous process. In other words, the injection of the polymer solution 4 and the aqueous solution 5 and the collection of hydrocarbons take place substantially simultaneously and continuously.

When the method according to the invention is carried out, the pressure in the subterranean formation 1 can remain substantially constant.

Desalination Process

According to some embodiments, and as mentioned above, the aqueous solution 5 as well as the polymer solution 4 derive from an initial source which can be chosen from any kind of surface water (including sea water), brackish brine and produced water. In case the initial source is produced water, the produced water can be separated from the stream of collected hydrocarbons recovered from the production well(s).

The initial source can be subjected to a desalination process in order to provide the aqueous solution 5 and the solution to which polymer can be added to form the polymer solution 4.

More specifically, the initial source having an initial salinity can be subjected to a desalination process at the end of which a first solution is obtained on the one hand and a second solution is obtained on the other hand. The first solution has a salinity which is lower than the initial salinity of the initial source, while the second solution has a salinity which is higher than the initial salinity of the initial source.

According to some embodiments, the first solution corresponds to the aqueous solution 5 which is injected into the lower layer 3 of the subterranean formation 1.

According to some embodiments, the second solution can be used to form the polymer solution 4 injected into the upper layer 2 of the subterranean formation 1.

The initial salinity of the initial source may be from 20 to 300 g/L and preferably from 30 to 300 g/L. For example, the initial salinity of the initial source may be from 20 to 30 g/L; or from 30 to 40 g/L; or from 40 to 50 g/L; or from 50 to 60 g/L; or from 60 to 70 g/L; or from 70 to 80 g/L; or from 80 to 90 g/L; or from 90 to 100 g/L; or from 100 to 120 g/L; or from 120 to 140 g/L; or from 140 to 160 g/L; or from 160 to 180 g/L; or from 180 to 200 g/L; or from 200 to 220 g/L; or from 220 to 240 g/L; or from 240 to 260 g/L; or from 260 to 280 g/L; or from 280 to 300 g/L.

The desalination process can be a process of reverse osmosis, or forward osmosis, or nanofiltration, or ultrafiltration, or electrodialysis, or distillation, or membrane filtration; or a combination of the above.

The invention claimed is:

1. A method for recovering hydrocarbons from a subterranean formation comprising an upper layer and lower layer, the upper layer having a permeability higher than a permeability of the lower layer; the method comprising:
   injecting a polymer solution, having a salinity and containing a polymer, into the upper layer via at least one injection well;
   injecting an aqueous solution into the lower layer via at least one injection well, the aqueous solution having a salinity, wherein the salinity of the aqueous solution is lower than the salinity of the polymer solution, salinity being expressed as $g \cdot L^{-1}$ of Total Dissolved Solids; and
   collecting hydrocarbons displaced by at least one of the injected polymer solution and the injected aqueous solution, via at least one production well.

2. The method according to claim 1, wherein the permeability of the upper layer is higher than the permeability of the lower layer by a factor of at least 2.

3. The method according to claim 1, wherein the permeability of the upper layer is from 100 to 10 000 mD.

4. The method according to claim 1, wherein the permeability of the lower layer is from 1 to 50 mD.

5. The method according to claim 1, wherein the salinity of the polymer solution is from 40 to 400 g/L.

6. The method according to claim 1, wherein the salinity of the aqueous solution is less than 10 g/L.

7. The method according to claim 1, wherein the polymer solution has a viscosity from 1 to 200 cP.

8. The method according to claim 1, wherein the aqueous solution has a viscosity from 0.2 to 1 cP.

9. The method according to claim 1, wherein the polymer solution is has a concentration of polymer of from 3 000 to 7 000 ppm.

10. The method according to claim 1, wherein the polymer is chosen from hydrolyzed polyacrylamide, partially hydrolyzed polyacrylamide, poly-N,N-dimethylacrylamide, polyvinyl pyrrolidone, poly(vinylamines), poly(2-acrylamido-2-methyl-1-propanesulfonic acid), biopolymers such as scleroglucans and xanthan gum, hydrophobically-modified associative polymers, co-polymers of polyacrylamide, 2-acrylamido 2-methylpropane sulfonic acid, and N-vinyl pyrrolidone.

11. The method according to claim 1, wherein the polymer solution and the aqueous solution derive from an initial source chosen from sea water, brackish brine, and produced water.

12. The method according to claim 11, wherein
the initial source is subjected to a desalination process, thereby obtaining a first solution, the first solution being the aqueous solution and having a lower salinity than the initial source; and
a second solution, is used to form the polymer solution and the second solution having a higher salinity than the initial source.

13. The method according to claim 12, wherein the desalination process is chosen from reverse osmosis, forward osmosis, nanofiltration, ultrafiltration, electrodialysis, distillation, membrane filtration processes and combinations thereof.

14. The method according to claim 1, wherein the permeability of the upper layer is higher than the permeability of the lower layer by a factor of at least 5.

15. The method according to claim 1, wherein the permeability of the upper layer is higher than the permeability of the lower layer by a factor of at least 10.

16. The method according to claim 1, wherein the aqueous solution has a salinity of less than 5 g/L.

17. The method according to claim 1, wherein the polymer solution has a concentration of polymer of from 4 000 to 6 000 ppm (w/v).

* * * * *

UNITED STATES PATENT AND TRADEMARK OFFICE
CERTIFICATE OF CORRECTION

| | |
|---|---|
| PATENT NO. | : 11,713,660 B2 |
| APPLICATION NO. | : 17/430927 |
| DATED | : August 1, 2023 |
| INVENTOR(S) | : Arnaud Lager and Pierre-Edouard Schreiber |

It is certified that error appears in the above-identified patent and that said Letters Patent is hereby corrected as shown below:

In the Claims

In Column 9, Claim 9, Line 2, after "solution" delete "is".

Signed and Sealed this
Twelfth Day of September, 2023

*Katherine Kelly Vidal*

Katherine Kelly Vidal
*Director of the United States Patent and Trademark Office*